United States Patent [19]

McHugh et al.

[11] 4,056,378

[45] Nov. 1, 1977

[54] METHOD FOR PREPARATION OF $VO_2$CURRENT INRUSH LIMITERS FOR INCANDESCENT LAMPS

[75] Inventors: James P. McHugh, Pittsburgh; Philip J. Nalepa, Greensburg; Robert C. Miller, Pittsburgh, all of Pa.; Chester W. Dawson, Basking Ridge, N.J.

[73] Assignee: Westinghouse Electric Corporation, Pittsburgh, Pa.

[21] Appl. No.: 723,387

[22] Filed: Sept. 15, 1976

[51] Int. Cl.$^2$ ...................... C03B 32/00; C03B 35/00; H01B 1/06

[52] U.S. Cl. ........................................... 65/18; 65/32; 65/33; 106/39.5; 252/518; 252/520; 65/59 R

[58] Field of Search ..................... 65/33, 18, 32, 59 R; 106/39.5; 252/518.4, 520

[56] References Cited

U.S. PATENT DOCUMENTS

| | | | |
|---|---|---|---|
| 3,402,131 | 9/1968 | Futaki et al. | 252/518.4 X |
| 3,484,611 | 12/1969 | Futaki | 252/518.4 X |
| 3,503,902 | 3/1970 | Shimoda | 252/518.4 X |
| 3,542,697 | 11/1970 | Chamberland et al. | 252/518.4 |
| 3,562,188 | 2/1971 | Mitsuishi | 252/518.4 X |
| 3,690,974 | 9/1972 | Kawazoe | 252/518.4 |
| 3,729,575 | 4/1973 | Caldwell et al. | 252/518.4 X |
| 3,950,176 | 4/1976 | Deeg et al. | 252/518.4 X |
| 3,983,074 | 9/1976 | Kahn et al. | 252/518.4 X |
| 3,993,603 | 11/1976 | Nalepa et al. | 106/39.5 |

*Primary Examiner*—S. Leon Bashore
*Assistant Examiner*—Frank W. Miga
*Attorney, Agent, or Firm*—R. S. Lombard

[57] ABSTRACT

Current inrush limiter for incandescent lamps is made by mixing finely divided vanadium sesquioxide and vanadium pentoxide with finely divided glass-forming constituents which include vanadium compound. The mix is compacted and sintered in a substantially inert atmosphere which converts the vanadium oxides to vanadium dioxide maintained in a chemically stable and mechanically strong mass by vitreous binder.

15 Claims, No Drawings

METHOD FOR PREPARATION OF $VO_2$ CURRENT INRUSH LIMITERS FOR INCANDESCENT LAMPS

CROSS-REFERENCES TO RELATED APPLICATIONS

In copending application Ser. No. 585,732, filed June 10, 1975 by P. R. Emtage and P. J. Nalepa now U.S. Pat. No. 3,975,658 dated Aug. 17, 1976 and assigned to the present assignee, is disclosed a current inrush limiter which eliminates current overshoot by controlling the mass of the limiter within a relatively narrow range.

In copending application Ser. No. 585,731, filed concurrently with the aforesaid application, by P. J. Nalepa et al now U.S. Pat. No. 3,993,603 dated Nov. 23, 1976 and assigned to the present assignee, is disclosed an improved composition of vanadium oxide current limiter. The improved composition contains $MoO_3$ in amounts between 0.003–0.06 weight percent which provides a more gradual resistance-temperature transition and also provides a resistance which varies less at temperatures below the transition temperature.

BACKGROUND OF THE INVENTION

Incandescent lamps are commonly operated without current inrush limiters and, as a result of the current inrush with full voltage supplied to a cold filament, lamp life is generally considerably shortened. It has been generally recognized that, as the cold resistance tungsten filament is only approximately 1/20 to 1/10 of the hot resistance, the inrush current is about 10 to 20 times the normal operating current. This current inrush causes severe local overheating at high resistance spots in the filament. These spots rise to a temperature well in excess of the steady-state burning temperature of the filament. This local overheating causes more rapid evaporation of the filament in the area of these spots and the resistance of the spots is thus further raised. This process continues and is accelerated by each starting current surge, and eventually leads to the failure of a filament as a result of localized melting. To slow the process, as is well known in the art, a temperature-sensitive resistor having a negative temperature coefficient of electrical resistance may be connected in series with an incandescent lamp filament thereby greatly increasing lamp life by acting as a current inrush limiter.

Vanadium oxide has been suggested for externally-heated, temperature-sensitive resistors. In British Pat. No. 1,168,107 issued to Hitachi Limited and published Oct. 22, 1969 is described the method for producing a ceramic comprising of crystals of $VO_2$ suspended in a semiconductive oxide flux. The properties of vanadium-oxide ceramics are also described by Futaki in Vol. 4, No. 1, Jan., 1965 of the Japanese Journal Of Applied Physics, pages 28–41. Both the aforesaid British Patent and the Futaki Publication describe a method for making $VO_2$ current inrush limiters. Their method of making the $VO_2$ is by reduction of $V_2O_5$ to $VO_2$.

It has been found that the preparation of the $VO_2$ current inrush limiters by reduction or oxidation of higher or lower oxides, respectively, is difficult, and requires very carefully controlled conditions. Furthermore, $VO_2$ in the required powdered form is susceptible to oxidation which presents problems in storage and handling.

SUMMARY OF THE INVENTION

This invention provides a method of making a current inrush limiter for incandescent lamps substantially comprising vanadium dioxide particles. The particles are maintained in a chemically stable and mechanically strong mass of predetermined dimensions by a vitreous binder. The method comprises mixing together finely divided vanadium sesquioxide and vanadium pentoxide together with finely divided glass-forming constituents. The glass-forming constituents include at least one of vanadium oxide and metallic vanadate. The weight ratio of the total finely divided vanadium sesquioxide plus vanadium pentoxide to the total glass-forming constituents is from 98:2 to 70:30. There is desirably included in the mixture a small amount of an organic pressing lubricant. The mixture is then compacted into the shape desired for the limiter. The compact is then baked in an oxidizing atmosphere at a temperature sufficient to volatilize the organic lubricant but substantially below the melting temperature for vanadium pentoxide. The compact is then sintered in a substantially inert atmosphere at a temperature of from about 800° C to about 1100° C for a sufficient period of time to react and convert the mixed vanadium sesquioxide and vanadium pentoxide particles to vanadium dioxide and to form the glass-forming frit into a glassy matrix.

DESCRIPTION OF THE PREFERRED EMBODIMENTS

This invention relates to a method of making a current inrush limiter for incandescent lamps substantially comprising vanadium dioxide particles. The particles are maintained in a chemically stable and mechanically strong mass of predetermined dimensions by a vitreous binder. The method comprises mixing together finely divided vanadium sesquioxide and vanadium pentoxide together with finely divided glass-forming constituents. The molar ratio of the finely divided vanadium sesquioxide to the finely divided vanadium pentoxide should be within the range from 1:1 to 2:1. The glass-forming constituents should include at least one of vanadium oxide and metallic vanadate. The weight ratio of the total finely divided vanadium sesquioxide plus vanadium pentoxide to the total glass-forming constituents should be from 98:2 to 70:30. Desirably included in the mixture is a small amount of an organic pressing lubricant. The mixture is compacted into the shape desired for the limiter. The compact is baked in an oxidizing atmosphere at a temperature sufficient to volatilize the organic lubricant but substantially below the melting temperature for vanadium pentoxide. The compact is sintered in a substantially inert atmosphere at a temperature of from about 800° C to about 1100° C for a sufficient period of time to react and convert the mixed vanadium sesquioxide and vanadium pentoxide particles to vanadium dioxide and to form the glass-forming constituents into a glassy matrix.

As is well known, both vanadium sesquioxide ($V_2O_3$) and vanadium pentoxide ($V_2O_5$) are subject to some minor modifications from the stoichiometric formulations as recited above. Thus the exact formulation will normally vary slightly depending on initial processing conditions.

In one embodiment about 50 weight percent of finely divided vanadium sesquioxide and about 31 weight percent of finely divided vanadium pentoxide are mixed together with a frit of glass-forming constituents comprising about 18 weight percent. The vanadium sesquioxide is preferably prepared by heating $NH_4VO_3$ powder in a furnace in a flowing hydrogen atmosphere. The $NH_4VO_3$ is heated from room temperature to 350°–450° C. It is held in this temperature range until the vigorous gaseous evolution subsides. The temperature is then raised to 600° C, and maintained for about two hours. The product is then cooled in a flowing hydrogen atmosphere. The vanadium sesquioxide should be stored in a tightly sealed container. The glass-forming constituents may have the composition $(P_2O_5)_{1.2} \cdot (BaO)_{0.4} \cdot (V_2O_5)_{0.6}$ for example. These constituents may be added by melting and quenching a combination of $H_3PO_4$, $BaCO_3$ and $V_2O_5$ powder which produces a frit. The frit is ball milled to produce a fine powder.

A polyethylene glycol such as that manufactured by the Carbide and Carbowax Chemicals Company under the trademark "Carbowax 200" is included in the mixture as an organic pressing lubricant in the amount of 0.05 weight percent.

A dopant substantially comprising $MoO_3$ desirably is included in the mixture to vary the resistivity of the limiter. Preferably the $MoO_3$ has a concentration of about 0.03 weight percent of the mixture. While the $MoO_3$ can be incorporated into the limiter in a number of manners, it has been found convenient to incorporate the $MoO_3$ in the vanadium pentoxide by ball milling.

The vanadium sesquioxide and the doped vanadium pentoxide and the frit are mixed. The mixture is ball milled and then compacted into the shape desired for the limiter. The compact is baked at a temperature of about 300° C for about one hour in an oxidizing atmosphere to volatilize the organic lubricant. The compact is then sintered in a substantially inert atmosphere principally comprising argon or nitrogen at a temperature of 1000° C for about 24 minutes. Preferably a partial pressure of oxygen of $10^{-5}$ atmosphere is included in the sintering atmosphere. It has been found that a range of partial pressures of oxygen from about $10^{-3}$ to about $10^{-8}$ atmosphere desirably is used during sintering of the compact.

In another embodiment vanadium sesquioxide and vanadium pentoxide are mixed together in about equimolar amounts with a frit of the aforesaid glass-forming constituents comprising about 17.5 weight percent of the mixture. The preparation of the vanadium sesquioxide and addition, if desired, of the dopant $MoO_3$ to the mixture can be accomplished as described in the previous embodiment. Preferably about 0.05 weight percent of $MoO_3$ can be incorporated in the vanadium pentoxide. The mixture can, for example, consist of 62 grams of vanadium sesquioxide, 75 grams of doped vanadium pentoxide, mixed together with the glass-forming constituents prepared from 22 grams of 86% $H_3PO_4$ solution, 6 grams of $BaCO_3$, and 9 grams of doped vanadium pentoxide. The mixture is then compacted and sintered as described in the first embodiment. Baking is eliminated in this embodiment because no organic pressing lubricant is used.

Vanadium pentoxide has a relatively low melting point and by adding vanadium sesquioxide as specified to the mix in forming the present current inrush limiters, the tendency for the vanadium pentoxide to melt during the sintering is minimized and the formation of vanadium dioxide is speeded up. Coupled with the glass forming constituents as specified, the formation of the current inrush limiters is very reproducible and rapid.

We claim:

1. The method of making a current inrush limiter for incandescent lamps substantially comprising vanadium dioxide particles maintained in a chemically stable and mechanically strong mass of predetermined dimensions by a glassy matrix binder, which method comprises:

a. mixing together finely divided vanadium sesquioxide and vanadium pentoxide wherein the molar ratio of said finely divided vanadium sesquioxide to said finely divided vanadium pentoxide is from 1:1 to 2:1 together with finely divided glass-forming constituents which include at least one of vanadium oxide and metallic vanadate, with the weight ratio of said total finely divided vanadium sesquioxide plus vanadium pentoxide to said total glass-forming constituents being from 98:2 to 70:30;

b. compacting said mixture into the shape desired for said limiter;

c. sintering said compact in a substantially inert atmosphere at a temperature of from about 800° C to about 1100° C for a sufficient period of time to react and convert the mixed vanadium sesquioxide and vanadium pentoxide particles to vanadium oxide and to form said glass-forming constituents into said glassy matrix binder.

2. The method of claim 1, wherein said glass-forming constituents have the composition $(P_2O_5)_{1.2} \cdot (BaO)_{0.4} \cdot (V_2O_5)_{0.6}$.

3. The method of claim 1, wherein a dopant for said vanadium dioxide is included in said mixture.

4. The method of claim 3, wherein there is included with said substantially inert atmosphere in which said compact is sintered a partial pressure of oxygen of from about $10^{-3}$ to $10^{-8}$ atmosphere.

5. The method of claim 4, wherein said substantially inert atmosphere principally comprises nitrogen.

6. The method of claim 5, wherein said finely divided vanadium sesquioxide is about 50 weight percent of said mixture, said finely divided vanadium pentoxide is about 31 weight percent of said mixture, and the glass-forming constituents are about 19 weight percent of said mixture.

7. The method of claim 6, wherein said mixture includes 0.05 weight percent of an organic pressing lubricant.

8. The method of claim 7, wherein prior to said sintering, said compact is baked in an oxidizing atmosphere at a temperature sufficient to volatilize said organic lubricant but substantially below the melting temperature for vanadium pentoxide.

9. The method of claim 8, wherein said organic lubricant is polyethylene glycol.

10. The method of claim 6, wherein said dopant is $MoO_3$ having a concentration of about 0.03 weight percent of said mixture.

11. The method of claim 8, wherein said baking of said compact is conducted at a temperature of about 300° C for about one hour.

12. The method of claim 11, wherein said sintering of said compact is conducted at a temperature of 1000° C for about 24 minutes.

13. The method of claim 5, wherein said finely divided vanadium sesquioxide and said finely divided vanadium pentoxide are mixed together in about equimolar ratio.

14. The method of claim 13, wherein said glass-forming constituents are about 17.5 weight percent.

15. The method of claim 14, wherein said dopant is $MoO_3$ having a concentration of 0.05 weight percent of said vanadium pentoxide.

* * * * *